Dec. 3, 1968         S. SANVITALE         3,413,910
COFFEEMAKING DEVICE
Filed Aug. 28, 1967
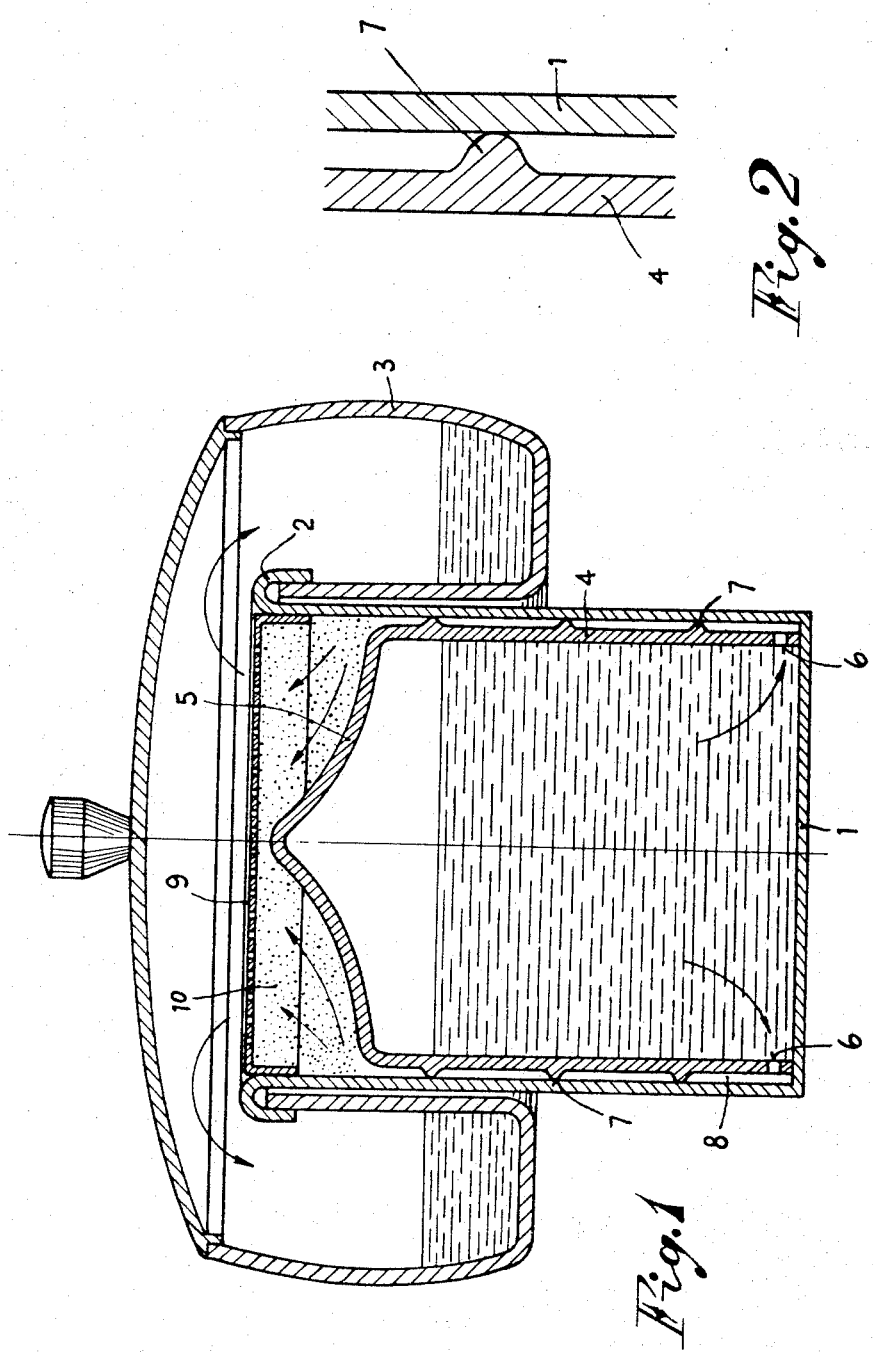

United States Patent Office 3,413,910
Patented Dec. 3, 1968

3,413,910
COFFEEMAKING DEVICE
Salvatore Sanvitale, Via Buccella 6, Trento, Italy
Filed Aug. 28, 1967, Ser. No. 663,612
Claims priority, application Italy, Aug. 31, 1966,
775,776/66
4 Claims. (Cl. 99—303)

ABSTRACT OF THE DISCLOSURE

A device for making "espresso"-type coffee which consists of an inverted glass-shaped element inserted into an outer vessel of larger diameter, and an annular urn connected to the top of the outer vessel. The glass-shaped element is filled with water and inserted into the larger vessel; afterwards the two are turned upside down, powdered coffee is poured into the ensemble, a filter is threaded on top and the urn is positioned. Upon heating, the water escapes through openings laterally provided in the inverted glass-shaped element, passes through the annulus provided by the differential diameters of the two vessels, filters through the coffee powder and the filter and collects in the annular urn.

---

The present invention relates to coffee-making devices of the non-commercial, family type suitable for preparing the so-called "espresso"-type brew.

Briefly stated, the apparatus of the invention comprises a more or less cylindrical vessel with a filtering disc threadable on the uppermost portion thereof, an element shaped like an inverted goblet or glass and resting within the vessel, and a coffee receiver positioned externally to the vessel and provided with a suitable lid. The inner, glass-shaped element is provided with a number of slots for the exit of the water and with a number of protruding tips to assure that a passage be maintained between the outer surface of the glass-shaped element and the inner surface of the vessel containing it. In practice, water is introduced into the inverted glass-shaped element and the powdered coffee is introduced in the space between the inverted element and the filtering disc positioned above it. The heated water will escape through the slots of the inverted element and pass through the mentioned passage between the two surfaces, through the powdered coffee, and into the external receiver.

A clearer understanding of the device will be had from the following detailed description of the invention and from the accompanying drawings, in which:

FIGURE 1 shows in cross-section the assembled coffee-making device; and

FIGURE 2 shows enlarged the detail relative to the protruding tips of the glass-shaped element for guiding and centering the same within the vessel containing it and, consequently, determining the passage between the vessel and the glass-shaped element.

Referring now to the drawings, the cylindrical base vessel 1 of the device has its upper lip 2 bent outwardly and has suitably connected to the tip 2 an external annular receiver 3 for collecting the brewed coffee. Inside the base vessel 1 there is provided an element 4 shaped like an inverted glass or goblet. Element 4 is conically shaped in its upper portion and the outer surface is concave as shown clearly at 5. At the other extremity, the inverted-glass element 4 is provided with a number of apertures or slots 6 for the passage of water. Furthermore, element 4 has a number of protruding tips 7 which serve as guide and centering means for element 4 when inserted into the base vessel 1. The outer diameter of element 4 is smaller than the inner diameter of the base vessel 1, so that a passage 8 will be obtained between 4 and 1 for the rising heated water. The width of this passage is in fact determined by the protruding tips 7 which may be, if so desired, provided on the inner surface of the base vessel 1, rather than on the outer surface of element 4.

At the upper extremity of the base vessel 1, which extremity is suitably threaded, there is provided a disc 9 which is full of small openings and serves as a filter and as a lid for the chamber 10 in which the powdered coffee is poured. Chamber 10 is, therefore, substantially formed by the disc 9 and the concave, conical outer surface of element 4.

The operation of the device is as follows: element 4 is filled with water by holding it as a glass (the conical tip 5 pointing downwardly). The filled element 4 is then inserted into the base vessel 1 and, thereafter, the two are turned upsidedown as shown in FIGURE 1. After the powdered coffee is positioned in chamber 10, the filter-disc 9 is threaded in place and the receiver vessel 3 is set in position about lip 2 of the base vessel. The assembled device is set upon a source of heat (stove or the like) and the heated water is forced to pass upwardly through the slots 6 and the passage 8 in the direction indicated by the arrows in the drawings. The water, upon heating, rises and, following the direction of the arrows, passes through the powdered coffee and the filter disc 9 and collects as liquid coffee in the body of the receiver 3.

It is particularly to be noted that the curved and concave shape of element 4 allows the rising water to disperse itself throughout the entire mass of powdered coffee following the flow shown illustratively in the drawings.

If so desired, the filtering disc may be provided with radial structural reinforcements (not shown), so as to counteract, especially at its center, the forces exerted thereagainst by the inverted element 4.

What is claimed is:

1. A coffeemaking device which comprises: a cylindrical, base vessel having a closed first extremity and an open second extremity with outwardly bent peripherical lip; a receiving urn, annularly shaped and connectable to said lip; and an inverted glass-shaped element, insertable into said base vessel and having a substantially conical, concave and closed first extremity, a cylindrical, open second extremity with lateral apertures circumferentially thereto and a plurality of tips protruding externally between said first and second extremities of said element.

2. The device according to claim 1, wherein there is provided an annular passage circumferentially between said base vessel and said glass-shaped element insertable therein, for the passage of water from said element upwardly through said lateral apertures.

3. The device according to claim 1, wherein there is provided a filtering disc, threadably mounted on the said open second extremity of said base vessel, so as to define with said closed first extremity of said glass-shaped element a chamber for containing powdered coffee and mixing the coffee with the ascending boiling water.

4. A coffeemaking device which comprises:
(a) a cylindrical base vessel having a closed first extremity and an open second extremity with threads circumferentially thereon and an outwardly bent peripherical lip;
(b) a coffee-receiving urn, annularly shaped and connectable to said lip and having a removable lid thereon;
(c) an inverted glass-shaped element; insertable into said base vessel; having a substantially conical, concave and closed first extremity; and a cylindrical, open, second extremity with lateral apertures circumferentially thereto; and a plurality of tips protruding externally between said first and second extremities to define an annular passage between said element and said base vessel; and (d) a filtering disc, threadable on said second extremity of said base vessel and defining with said closed first extremity of said glass-shaped element a chamber for depositing powdered coffee.

References Cited

UNITED STATES PATENTS

| 2,234,464 | 3/1941 | Caldor | 99—303 |
| 3,077,156 | 2/1963 | Egi | 99—303 X |
| 3,368,476 | 2/1968 | Mancioli | 99—303 X |

ROBERT W. JENKINS, *Primary Examiner.*